United States Patent
Iwamoto et al.

(10) Patent No.: US 11,916,237 B2
(45) Date of Patent: Feb. 27, 2024

(54) NON-AQUEOUS ELECTROLYTE SECONDARY BATTERY

(71) Applicant: Panasonic Intellectual Property Management Co., Ltd., Osaka (JP)

(72) Inventors: Takuya Iwamoto, Osaka (JP); Satoshi Nishitani, Osaka (JP); Masaki Deguchi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 440 days.

(21) Appl. No.: 16/975,797

(22) PCT Filed: Feb. 13, 2019

(86) PCT No.: PCT/JP2019/004941
§ 371 (c)(1),
(2) Date: Aug. 26, 2020

(87) PCT Pub. No.: WO2019/167611
PCT Pub. Date: Sep. 6, 2019

(65) Prior Publication Data
US 2020/0411869 A1    Dec. 31, 2020

(30) Foreign Application Priority Data

Feb. 27, 2018   (JP) ................. 2018-033754

(51) Int. Cl.
*H01M 4/62* (2006.01)
*H01M 4/133* (2010.01)
(Continued)

(52) U.S. Cl.
CPC .......... *H01M 4/622* (2013.01); *H01M 4/133* (2013.01); *H01M 4/364* (2013.01); *H01M 4/386* (2013.01);
(Continued)

(58) Field of Classification Search
CPC ...... H01M 4/386; H01M 4/131; H01M 4/622; H01M 4/364; H01M 4/587; H01M 4/362;
(Continued)

(56) References Cited

U.S. PATENT DOCUMENTS

2012/0258357 A1   10/2012  Kim
2015/0243995 A1*   8/2015  Chu ..................... H01M 4/133
                                                        523/447
(Continued)

FOREIGN PATENT DOCUMENTS

CN    107112522 A    8/2017
CN    107251304 A   10/2017
(Continued)

OTHER PUBLICATIONS

International Search Report dated May 21, 2019, issued in counterpart application No. PCT/JP2019/004941 (2 pages).

(Continued)

*Primary Examiner* — Christopher P Domone
*Assistant Examiner* — Jonathan William Estes
(74) *Attorney, Agent, or Firm* — WHDA, LLP

(57) ABSTRACT

A non-aqueous electrolyte secondary battery including a positive electrode, a negative electrode, and an electrolyte. The negative electrode includes a negative electrode active material capable of electrochemically absorbing and releasing lithium, and a binder. The negative electrode active material includes a Si-containing material, and the binder includes at least one cellulose compound selected from the group consisting of a carboxyalkyl cellulose and a salt thereof. The electrolyte includes a non-aqueous solvent, and a lithium salt dissolved in the non-aqueous solvent. The lithium salt includes lithium bis(fluorosulfonyl)imide: LFSI.

13 Claims, 1 Drawing Sheet

(51) Int. Cl.
  *H01M 4/36* (2006.01)
  *H01M 4/38* (2006.01)
  *H01M 4/587* (2010.01)
  *H01M 10/0525* (2010.01)
  *H01M 10/0568* (2010.01)
  *H01M 10/0569* (2010.01)
  *H01M 4/02* (2006.01)

(52) U.S. Cl.
  CPC ....... *H01M 4/587* (2013.01); *H01M 10/0525* (2013.01); *H01M 10/0568* (2013.01); *H01M 10/0569* (2013.01); *H01M 2004/027* (2013.01); *H01M 2300/0025* (2013.01)

(58) Field of Classification Search
  CPC ......... H01M 10/0525; H01M 10/0568; H01M 10/0569; H01M 2004/027; H01M 2300/0025
  See application file for complete search history.

(56) References Cited

U.S. PATENT DOCUMENTS

| | | |
|---|---|---|
| 2016/0028110 A1 | 1/2016 | Yu et al. |
| 2016/0218357 A1* | 7/2016 | Yoshikawa ........... H01M 4/382 |
| 2016/0260967 A1* | 9/2016 | Matus ................... H01M 4/131 |
| 2017/0194623 A1* | 7/2017 | Mohri ................... C01B 33/021 |
| 2017/0309896 A1 | 10/2017 | Jeong et al. |
| 2017/0346066 A1 | 11/2017 | Sunano et al. |
| 2018/0013131 A1 | 1/2018 | Yamamoto et al. |
| 2018/0019500 A1 | 1/2018 | Miura |
| 2019/0089003 A1 | 3/2019 | Noguchi et al. |
| 2019/0181494 A1* | 6/2019 | Maeda ............. H01M 10/0569 |

FOREIGN PATENT DOCUMENTS

| | | | |
|---|---|---|---|
| CN | 107710466 A * | 2/2018 | ............. C01B 32/05 |
| JP | 2014-192143 A | 10/2014 | |
| JP | 2015-537352 A | 12/2015 | |
| WO | 2016/121322 A1 | 8/2016 | |
| WO | 2016/143543 A1 | 9/2016 | |
| WO | 2017/154788 A1 | 9/2017 | |
| WO | 2018/025621 A1 | 2/2018 | |
| WO | WO-2018025621 A1 * | 2/2018 | ........ H01M 10/0525 |

OTHER PUBLICATIONS

The Extended European Search Report dated Mar. 24, 2021, issued in counterpart EP Application No. 19760075.2. (7 Pages).

English Translation of Chinese Search Report dated Feb. 9, 2023, issued in counterpart CN application No. 201980014130.1. (3 pages).

English Translation of Chinese Search Report dated Jun. 27, 2023 for the related Chinese Patent Application No. 201980014130.1.

* cited by examiner

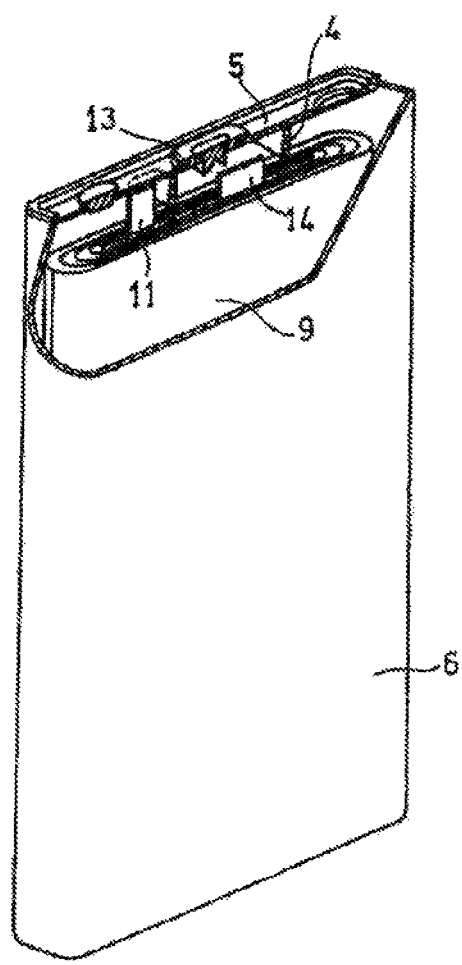

NON-AQUEOUS ELECTROLYTE SECONDARY BATTERY

TECHNICAL FIELD

The present invention relates to a non-aqueous electrolyte secondary battery.

BACKGROUND ART

In order to improve the capacity of non-aqueous electrolyte secondary batteries, studies have been carried out to use a Si-containing material as a negative electrode active material. The Si-containing material, however, greatly expands and contracts during charge and discharge. Therefore, with repeating the charge and discharge, the contact resistance increases between the negative electrode active material particles and between the negative electrode active material particles and the negative electrode current collector. Moreover, there sometimes occurs a break in the particle surface layer (SEI: Solid Electrolyte Interface) of the negative electrode active material or a particle crack in the negative electrode active material. This leads to deterioration in cycle characteristics.

As a method to suppress the deterioration of the cycle characteristics, one proposal suggests making the negative electrode contain carboxymethyl cellulose (CMC) (e.g., Patent Literature 1).

CITATION LIST

Patent Literature

[PTL 1] PCT Publication No. WO 2016/121322

SUMMARY OF INVENTION

When the negative electrode containing CMC is impregnated with an electrolyte, the CMC sometimes swells. When the CMC swells, this weakens the binding force of the CMC that is acting between the negative electrode active material particles and between the negative electrode active material particles and the negative current collector. Since the Si-containing material greatly expands and contracts during charge and discharge, when the binding force of the CMC is weakened in association with the expansion, the internal resistance tends to increase, and the cycle characteristics also tend to deteriorate.

In view of the above, one aspect of the present invention relates to a non-aqueous electrolyte secondary including a positive electrode, a negative electrode, and an electrolyte, the negative electrode including a negative electrode active material capable of electrochemically absorbing and releasing lithium, and a binder; the negative electrode active material including a Si-containing material; the binder including at least one cellulose compound selected from the group consisting of a carboxyalkyl cellulose and a salt thereof; the electrolyte including a non-aqueous solvent, and a lithium salt dissolved in the non-aqueous solvent; the lithium salt including lithium bis(fluorosulfonyl)imide: LFSI.

According to the present invention, it is possible to provide a non-aqueous electrolyte secondary battery having a high capacity and having a small internal resistance and excellent cycle characteristics.

BRIEF DESCRIPTION OF DRAWING

FIG. 1 A schematic partially cut-away oblique view of a non-aqueous electrolyte secondary battery according to an embodiment of the present invention.

DESCRIPTION OF EMBODIMENTS

A non-aqueous electrolyte secondary battery according to an embodiment of the present invention includes a positive electrode, a negative electrode, and an electrolyte. The negative electrode includes a negative electrode active material capable of electrochemically absorbing and releasing lithium, and a binder. The negative electrode active material includes a Si-containing material. The binder includes at least one cellulose compound selected from the group consisting of a carboxyalkyl cellulose and a salt thereof. The electrolyte includes a non-aqueous solvent, and a lithium salt (solute) dissolved in the non-aqueous solvent, and the lithium salt includes lithium bis(fluorosulfonyl)imide: $LiN(SO_2F)_2$ (hereinafter sometimes referred to as LFSI).

Including a Si-containing material in the negative electrode active material leads to a high capacity; however, the Si-containing material expands and contracts greatly during charge and discharge, which tends to cause the internal resistance to increase and the cycle characteristics to deteriorate. To address this, a cellulose compound is used as the binder, and LFSI is contained in the electrolyte, so that the increase in the internal resistance and the deterioration in the cycle characteristics can be significantly suppressed. When the negative electrode including a cellulose compound is impregnated with an electrolyte including LFSI, the swelling of the cellulose compound can be reduced. Thus, the high binding force of the cellulose compound can be maintained, and the increase in the contact resistance between the negative electrode active material particles and between the negative electrode active material particles and the negative electrode current collector can be suppressed.

Given that the swelling of the cellulose compound is reduced, it is not necessary to increase the amount of the cellulose compound, in consideration of a reduction in the binding force of the cellulose compound due to its swelling. Therefore, even with a small amount of the cellulose compound (e.g., 1.5 parts by mass or less per 100 parts by mass of the negative electrode active material), the binding force can be maintained. Therefore, a sufficiently large amount of the negative electrode active material can be contained in the negative electrode, and thus, a high capacity can be achieved. Moreover, an increase in the viscosity of the negative electrode slurry can be avoided which otherwise occurs when the amount of the cellulose compound is increased.

The factors affecting the degree of swelling of the cellulose compound are, for example, the ion concentrations of the electrolyte and the cellulose compound at the time of impregnating the negative electrode containing the cellulose compound with the electrolyte. For example, when the ion concentration of the electrolyte is smaller than that of the cellulose compound, a tendency develops that the solvent permeates from outside toward inside of the cellulose compound so as to reduce the ion concentration of the cellulose compound. This makes the cellulose compound likely to swell. LFSI has a high dissociation degree, and the Li ion concentration in the electrolyte tends to increase. This is presumably one of the factors that serve to suppress the swelling of the cellulose compound.

The binder includes at least one cellulose compound selected from the group consisting of a carboxyalkyl cellulose and a salt thereof. The cellulose compound may also serve as a thickener. The alkyl group moiety of the carboxyalkyl group has, for example, 1 to 4 carbon atoms. The carboxyalkyl cellulose is preferably carboxymethyl cellulose. Carboxymethyl cellulose and a salt thereof have a moderate viscosity, and tend to moderately cover the negative electrode active material particles. Thus, the aforementioned suppression of the increase in the contact resistance becomes remarkable. Also, a negative electrode slurry can be easily prepared.

In view of the ease of preparation of the negative electrode slurry and the advantage in improving the battery characteristics, it is preferably to use a salt of carboxymethyl cellulose. Examples of the salt of carboxymethyl cellulose include: an alkali metal salt, such as lithium salt and sodium salt, and an ammonium salt. Among them, a sodium salt of a carboxyalkyl cellulose is preferable, and a sodium salt of carboxymethyl cellulose is more preferable.

In view of the ease of preparation of the negative electrode slurry and the advantage in improving the battery characteristics, in the carboxyl groups contained in the carboxyalkyl cellulose, a ratio (degree of neutralization) of the hydrogen atoms of the carboxyl groups replaced with other atoms such as alkali metal atoms is preferably 30% or more.

The cellulose compound has a weight-average molecular weight of preferably 100,000 or more and 1,000,000 or less. When the weight-average molecular weight of the cellulose compound is within the above range, the cellulose compound can fully exert its effect on improving the cycle characteristics and reducing the internal resistance, and the gelation (increase in viscosity) of the negative electrode slurry can be suppressed, which eases the production of the negative electrode.

The cellulose compound is contained in the negative electrode in an amount of preferably 1.5 parts by mass or less per 100 parts by mass of the negative electrode active material. When the amount of the cellulose compound in the negative electrode is 1.5 parts by mass or less per 100 parts by mass of the negative electrode active material, the amount of the negative electrode active material can be sufficiently large, and a further high capacity can be achieved. In this case, the negative electrode can have sufficient flexibility, and the cycle characteristics can be further improved. Moreover, the viscosity of the negative electrode slurry can be reduced, which eases the preparation of the negative electrode slurry.

The amount of the cellulose compound in the negative electrode is preferably 0.4 parts by mass or more and 2.0 parts by mass or less per 100 parts by mass of the negative electrode active material. When the amount of the cellulose compound in the negative electrode is 0.4 parts by mass or more per 100 parts by mass of the negative electrode active material, the cellulose compound can fully exert its effect on improving the cycle characteristics and reducing the internal resistance. More preferably, the amount of the cellulose compound in the negative electrode is 0.5 parts by mass or more and 1.5 parts by mass or less per 100 parts by mass of the negative electrode active material.

The electrolyte may further include $LiPF_6$, in addition to LFSI, as a lithium salt dissolved in the non-aqueous solvent. The $LiPF_6$ is likely to form a passivation film on a surface of a member constituting a battery, such as an outer can. The passivation film serves to protect the member. In this case, a ratio of LFSI to the total of LFSI and $LiPF_6$ is preferably 7 mol % or more and 79 mol % or less, more preferably 15 mol % or more and 50 mol % or less.

The lithium salt may further contain another lithium salt, in addition to LFSI and $LiPF_6$. Even in this case, a ratio of the total of LFSI and $LIPF_6$ in the lithium salt is preferably 80 mol % or more, more preferably 90 mol % or more. By controlling the ratio of the total of LFSI and $LIPF_6$ in the lithium salt within the above range, a battery excellent in cycle characteristics can tend to be obtained.

A total concentration of LFSI and $LIPF_6$ in the electrolyte is preferably 1 mol/L or more and 2 mol/L or less. The LFSI and the $LiPF_6$ are preferably contained in the electrolyte respectively at a concentration of 0.1 mol/L or more and 1.1 mol/L or less and at a concentration of 0.3 mol/L or more and 1.3 mol/L or less.

In view of increasing the capacity of the negative electrode, the negative electrode active material includes a Si-containing material (a later-described negative electrode material LSX and the like) that electrochemically absorbs and releases lithium ions. The Si-containing material, however, expands and contracts during charge and discharge. Increasing the ratio thereof in the negative electrode active material tends to cause a contact failure between the negative electrode active material and the negative electrode current collector, as the charge and discharge proceed. To address this, the negative electrode active material preferably further includes a carbon material that electrochemically absorbs and releases lithium ions. By using the Si-containing material and the carbon material in combination, it is possible to improve the cycle characteristics while imparting a high capacity of the Si-containing material to the negative electrode. In view of increasing the capacity and improving the cycle characteristics, a ratio of the carbon material to a total of the Si-containing material and the carbon material is preferably 98 mass % or less, more preferably 70 mass % or more and 98 mass % or less, still more preferably 75 mass % or more and 95 mass % or less.

Examples of the carbon material used for the negative electrode active material include graphite, graphitizable carbon (soft carbon), and non-graphitizable carbon (hard carbon). Preferred among them is graphite, which is stable during charge and discharge and whose irreversible capacity is small. The graphite means a material having a graphite-like crystal structure, examples of which include natural graphite, artificial graphite, and graphitized mesophase carbon particles. These carbon materials may be used singly or in combination of two or more kinds.

Next, a detailed description will be given below of a non-aqueous electrolyte secondary battery according to an embodiment of the present invention. The non-aqueous electrolyte secondary battery includes, for example, a negative electrode as described below, a positive electrode, and an electrolyte.

Negative Electrode

The negative electrode includes, for example, a negative electrode current collector, and a negative electrode mixture layer formed on a surface of the negative electrode current collector and containing a negative electrode active material. The negative electrode mixture layer can be formed by applying a negative electrode slurry of a negative electrode mixture dispersed in a dispersion medium, to a surface of the negative electrode current collector, and drying the slurry. The dry coating film may be rolled, if necessary. The negative electrode mixture layer may be formed on one surface or both surfaces of the negative electrode current collector.

The negative electrode mixture includes a negative electrode active material and a binder as essential components, and may contain a conductive agent, a thickener, and other optional components. The negative electrode active material includes at least the above-mentioned Si-containing material, and preferably further includes the above-mentioned carbon material.

Examples of the Si-containing material include a silicon oxide ($SiO_x$: $0.5 \leq x \leq 1.5$), and a composite material including a lithium silicate phase and silicon particles dispersed in the lithium silicate phase (hereinafter, "negative electrode material LSX" or simply "LSX"). The higher the content of silicon particles in the negative electrode material LSX is, the higher the negative electrode capacity is.

The lithium silicate phase has a composition represented by $Li_ySiO_z$, where $0 \leq y \leq 8$ and $0.2 \leq z \leq 6$. A composition represented by $Li_{2u}SiO_{2+u}$ ($0 < u \leq 2$) is more preferable.

In the lithium silicate phase, as compared to in $SiO_x$, which is a composite of $SiO_2$ and microfine silicon, the number of sites that can react with lithium is small, and a new irreversible reaction hardly occurs during charge and discharge. When the lithium silicate phase includes silicon particles dispersed therein, excellent charge-discharge efficiency can be obtained at the early stage of charge and discharge. Moreover, since the content of silicon particles can be changed as desired, a high-capacity negative electrode can be designed.

Silicon particles dispersed in the lithium silicate phase has a crystallite size of, for example, 10 nm or more. The silicon particles have a particulate phase of silicon (Si) simple substance. When the size of crystallites of the silicon particles is 10 nm or more, the surface area of the silicon particles is suppressed small, and the deterioration of the silicon particles accompanied by the generation of irreversible capacity is unlikely to occur. The crystallite size of the silicon particles can be calculated from the Scherrer formula, using a half-width of a diffraction peak attributed to the Si (111) plane of an X-ray diffractometry pattern of the silicon particle.

The negative electrode material LSX is excellent also in structural stability. This is because silicon particles are dispersed in the lithium silicate phase, which can suppress the expansion and contraction of the negative electrode material LSX associated with charge and discharge. In view of suppressing the cracking of the silicon particles themselves, the average particle diameter of the silicon particles before the first charge is preferably 500 nm or less, more preferably 200 nm or less, still more preferably 50 nm or less. After the first charge, the average particle diameter of the silicon particles is preferably 400 nm or less, more preferably 100 nm or less. By refining the silicon particles, the changes in volume during charge and discharge can be reduced, and the structural stability of the negative electrode material LSX can be further improved.

The average particle diameter of the silicon particles is measured by observing a cross-sectional SEM (scanning electron microscope) photograph of the negative electrode material LSX. Specifically, the average particle diameter of the silicon particles is obtained by averaging the maximum diameters of randomly selected 100 silicon particles. The silicon particle is formed of an aggregate of a plurality of crystallites.

In view of achieving a higher capacity, the content of silicon particles in the negative electrode material LSX is, for example, 30 mass % or more, and preferably, 35 mass % or more. In this case, the diffusion of the lithium ions is facilitated, and excellent load characteristics tend to be obtained. On the other hand, in view of improving the cycle characteristics, the content of silicon particles in the negative electrode material LSX is preferably 95 mass % or less, more preferably 75 mass % or less. In this case, the surface of the silicon particles is less exposed without being covered with the lithium silicate phase, and the side reaction between the non-aqueous electrolyte and the silicon particles tends to be reduced.

The content of silicon particles can be measured by Si-NMR. Desirable Si-NMR measuring conditions are shown below.

Measuring apparatus: solid nuclear magnetic resonance spectrometer (INOVA-400), available from Varian, Inc.
Probe: Varian 7 mm CPMAS-2
MAS: 4.2 kHz
MAS speed: 4 kHz
Pulse: DD (45° pulse+signal capture time 1H decoupling)
Repetition time: 1200 sec
Observation width: 100 kHz
Observation center: around −100 ppm
Signal capture time: 0.05 sec
Number of times of accumulation: 560
Sample amount: 207.6 mg The composition of the lithium silicate phase $Li_ySiO_z$ can be analyzed by, for example, the following procedure.

First, the mass of a sample of the negative electrode material LSX is weighed. Then, the contents of carbon, lithium, and oxygen in the sample are measured as described below. Next, the carbon content is subtracted from the mass of the sample. The contents of lithium and oxygen in the remaining amount are then measured. From the molar ratio of lithium (Li) to oxygen (O), a ratio of y to z can be determined.

The carbon content can be measured using a carbon/sulfur analyzer (e.g., EMIA-520, available from Horiba, Ltd.). The sample is weighted out on a magnetic board, to which an auxiliary agent is added. The sample is inserted into a combustion furnace (carrier gas: oxygen) heated to 1350° C. The amount of carbon dioxide gas generated during combustion is detected by infrared absorption spectroscopy. A calibration curve is obtained using carbon steel (carbon content: 0.49%) available from Bureau of Analysed Samples. Ltd., from which the carbon content in the sample is determined (a high-frequency induction heating furnace combustion and infrared absorption method).

The oxygen content can be measured using an oxygen/nitrogen/hydrogen analyzer (e.g., EGMA-830, available from Horiba, Ltd.). The sample is placed in a Ni capsule and put together with Sn pellets and Ni pellets serving as flux, into a carbon crucible heated at a power of 5.75 kW, to detect a produced carbon monoxide gas. From a calibration curve obtained using a standard sample $Y_2O_3$, the oxygen content in the sample is determined (an inert gas melting and non-dispersive infrared absorption method).

The lithium content can be measured as follows: the sample is completely dissolved in a heated fluoronitric acid (a heated mixed acid of hydrofluoric acid and nitric acid), followed by filtering to remove an undissolved residue, i.e., carbon, and then analyzing the obtained filtrate by inductively coupled plasma emission spectroscopy (ICP-AES). From a calibration curve obtained using a commercially available standard solution of lithium, the lithium content in the sample is determined.

Subtracting the carbon content, the oxygen content, and the lithium content from the mass of the sample of the negative electrode material LSX gives a silicon content. This silicon content involves the contribution of both forms of silicon present in the form of silicon particles and in the form of lithium silicate. The content of silicon particles can be determined by Si-NMR measurement, which can determine the content of silicon present in the form of lithium silicate in the negative electrode material LSX.

The negative electrode material LSX is preferably a particulate material having an average particle diameter of preferably 1 to 25 μm, more preferably 4 to 15 μm (hereinafter sometimes referred to as LSX particles). Within the above particle dimeter range, the negative electrode material LSX is less likely to undergo the stress caused by changes in volume associated with charge and discharge, and thus, excellent cycle characteristics tend to be obtained. Also, the LSX particles tend to have a moderate surface area, and the reduction in capacity due to a side reaction with the non-aqueous electrolyte can be suppressed.

The average particle diameter of the LSX particles means a particle diameter at 50% cumulative volume (volume average particle diameter) in a volumetric particle diameter distribution measured by a laser diffraction and scattering method. For the measurement, for example, "LA-750", available from Horiba, Ltd. (HORIBA) can be used.

The LSX particles preferably each include an electrically conductive material covering at least part of its surface. The lithium silicate phase is poor in electron conductivity. The electric conductivity of the LSX particles therefore tends to be low. By covering the surface with the conductive material, the conductivity can be improved significantly. The conductive layer is preferably thin enough not to substantially influence the average particle diameter of the LSX particles.

Examples of the negative electrode current collector include a non-porous electrically conductive substrate (e.g., metal foil), and a porous electrically conductive substrate (e.g., mesh, net, punched sheet). The negative electrode current collector may be made of, for example, stainless steel, nickel, a nickel alloy, copper, or a copper alloy. The negative electrode current collector may have any thickness. In view of balancing between maintaining the strength and reducing the weight of the negative electrode, the thickness is preferably 1 to 50 μm, more preferably 5 to 20 μm.

The binder includes at least the above-mentioned cellulose compound. Examples of the binder include: in addition to the above-mentioned cellulose compound, fluorocarbon resin, such as polytetrafluoroethylene and polyvinylidene fluoride (PVDF); polyolefin resin, such as polyethylene and polypropylene; polyamide resin, such as aramid resin; polyimide resin, such as polyimide and polyamide-imide; acrylic resin, such as polyacrylic acid, methyl polyacrylate, and ethylene-acrylic acid copolymer; vinyl resin, such as polyacrylonitrile and polyvinyl acetate; polyvinyl pyrrolidone; polyether sulfone; and a rubbery material, such as styrene-butadiene copolymer rubber (SBR). These may be used singly or in combination of two or more kinds.

Examples of the conductive agent include: carbons, such as acetylene black and carbon nanotubes; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. These may be used singly or in combination of two or more kinds.

Examples of the thickener include: cellulose derivatives, such as methyl cellulose (e.g., cellulose ether), other than the above-mentioned cellulose compound; saponificated products of a polymer having a vinyl acetate unit, such as polyvinyl alcohol; polyether (e.g., polyalkylene oxide, such as polyethylene oxide). These may be used singly or in combination of two or more kinds.

Examples of the dispersion medium include: water; alcohols, such as ethanol; ethers, such as tetrahydrofuran; amides, such as dimethylformamide; N-methyl-2-pyrrolidone (NMP); and a mixed solvent of these.

Positive Electrode

The positive electrode includes, for example, a positive electrode current collector, and a positive electrode mixture layer formed on a surface of the positive electrode current collector. The positive electrode mixture layer can be formed by applying a positive electrode slurry of a positive electrode mixture in a dispersion medium, onto a surface of the positive electrode current collector, and drying the slurry. The dry applied film may be rolled, if necessary. The positive electrode mixture layer may be formed on one surface or both surfaces of the positive electrode current collector.

The positive electrode active material may be a lithium composite metal oxide. Examples thereof include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMPO_4$, and $Li_2MPO_4F$ (M represents at least one selected from Na, Mg, Sc, Y, Mn, Fe, Co, Ni, Cu, Zn, Al, Cr, Pb, Sb and B). Here, a=0 to 1.2, b=0 to 0.9, c=2.0 to 2.3. The value "a" representing the molar ratio of lithium is measured upon production of the active material and is subjected to increase and decrease during charge and discharge.

Preferred among them is a lithium-nickel composite oxide represented by $Li_aNi_bM_{1-b}O_2$ (M represents at least one selected from Mn, Co and Al, 0<a≤1.2, 0.3≤b≤1). In view of achieving a high capacity, b preferably satisfies 0.85≤b≤1. In view of the crystal structure stability, more preferred is $Li_aNi_bCo_cAl_dO_2$ containing Co and Al as elements represented by M (0<a≤1.2, 0.85≤b<1, 0<c<0.15, 0<d≤0.1, b+c+d=1).

Examples of the binder and the conductive agent may be as those exemplified for the negative electrode. The conductive agent may be graphite, such as natural graphite and artificial graphite.

The form and the thickness of the positive electrode current collector may be respectively selected from the forms and the ranges corresponding to those of the negative electrode current collector. The positive electrode current collector may be made of, for example, stainless steel, aluminum, an aluminum alloy, and titanium.

Electrolyte

The electrolyte includes a non-aqueous solvent and a lithium salt dissolved in the non-aqueous solvent, and the lithium salt includes LFSI.

The lithium salt is contained in the electrolyte preferably at a concentration of, for example, 0.5 mol/L or more and 2 mol/L or less. By controlling the lithium salt concentration within the above range, an electrolyte having excellent ion conductivity and moderate viscosity can be obtained. Note that the lithium salt concentration is not limited to the above.

The lithium salt that may be used in addition to LFSI is a known lithium salt. Examples of the preferred lithium salt include: $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylate, LiCl, LiBr, LiI, borates, and imides. Examples of the borates include lithium bis(1,2-benzenediolate(2-)-O,O') borate, lithium bis(2,3-naphthalenediolate (2-)-O,O') borate, lithium bis(2,2'-biphenyldiolate(2-)-O,O') borate, lithium bis(5-fluoro-2-olate-1-benzenesulfonate-O, O') borate. Examples of the imides include lithium bistrifluoromethanesulfonyl imide ($LiN(CF_3SO_2)_2$), lithium trifluoromethanesulfonyl nonafluorobutanesulfonyl imide ($LiN(CF_3SO_2)(C_4F_9SO_2)$), and lithium bispentafluoroethanesulfonyl imide ($LiN(C_2F_5SO_2)_2$). More preferred among them is $LiPF_6$. These lithium salts may be used singly or in combination of two or more kinds Examples of the non-aqueous solvent include cyclic carbonic acid esters (except a later-described unsaturated cyclic carbonic acid ester), chain carbonic acid esters, cyclic carboxylic acid esters, and chain carboxylic acid esters. The cyclic carbonic acid esters are exemplified by propylene carbonate (PC) and ethylene carbonate (EC). The chain carbonic acid esters are exemplified by diethyl carbonate (DEC), ethyl methyl carbonate (EMC), and dimethyl carbonate (DMC). The cyclic carboxylic acid esters are exemplified by γ-butyrolactone (GBL) and γ-valerolactone (GVL). The chain carboxylic acid esters are exemplified by methyl formate, ethyl formate, propyl formate, methyl acetate, ethyl acetate, propyl acetate, methyl propionate, ethyl propanoate, and propyl propionate. These non-aqueous solvents may be used singly or in combination of two or more kinds.

The non-aqueous solvent preferably includes a chain carboxylic acid ester. In this case, the lithium salt (LFSI and the like) easily dissociates in the electrolyte, which is advantageous in suppressing the swelling of the cellulose compound. The ratio of the chain carboxylic acid ester in the non-aqueous solvent is preferably 4 vol % or more and 90 vol % or less.

The electrolyte may further include, as an additive, a cyclic carbonic acid ester having at least one carbon-carbon unsaturated bond in its molecule (hereinafter referred to as an unsaturated cyclic carbonic acid ester). Decomposition of the unsaturated cyclic carbonic acid ester on the negative electrode forms a film with excellent lithium ion conductivity, on the negative electrode surface. This can enhance the charge-discharge efficiency.

The unsaturated cyclic carbonic acid ester may be a known compound. Preferred examples of the unsaturated cyclic carbonic acid ester include vinylene carbonate, 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinyl ethylene carbonate, and divinyl ethylene carbonate. Among them, at least one selected from the group consisting of vinylene carbonate, vinyl ethylene carbonate, and divinyl ethylene carbonate is preferred. These unsaturated cyclic carbonic acid esters may be used singly or in combination of two or more kinds. In the unsaturated cyclic carbonate ester, one or more hydrogen atoms may be replaced with fluorine atoms.

Separator

Usually, it is desirable to interpose a separator between the positive electrode and the negative electrode. The separator is excellent in ion permeability and has moderate mechanical strength and electrically insulating properties. The separator may be, for example, a microporous thin film, a woven fabric, or a nonwoven fabric. The separator is preferably made of, for example, polyolefin, such as polypropylene or polyethylene.

In an exemplary structure of the non-aqueous electrolyte secondary battery, an electrode group formed by winding the positive electrode and the negative electrode with the separator interposed therebetween is housed together with the non-aqueous electrolyte in an outer case. The wound-type electrode group may be replaced with a different form of the electrode group, for example, a stacked-type electrode group formed by stacking the positive electrode and the negative electrode with the separator interposed therebetween. The non-aqueous electrolyte secondary battery may be in any form, such as cylindrical type, prismatic type, coin type, button type, or laminate type.

FIG. 1 is a schematic partially cut-away oblique view of a non-aqueous electrolyte secondary battery according to an embodiment of the present invention.

The battery includes a bottomed prismatic battery case 6, and an electrode group 9 and an electrolyte (not shown) housed in the battery case 6. The electrode group 9 has a long negative electrode, a long positive electrode, and a separator interposed therebetween and preventing them from directly contacting with each other. The electrode group 9 is formed by winding the negative electrode, the positive electrode, and the separator around a flat plate-like winding core, and then removing the winding core.

A negative electrode lead 14 is attached at its one end to the negative electrode current collector of the negative electrode, by means of welding or the like. A positive electrode lead 11 is attached at its one end to the positive electrode current collector of the positive electrode, by means of welding or the like. The negative electrode lead 14 is electrically connected at its other end to a negative electrode terminal 13 disposed at a sealing plate 5. The positive electrode lead 11 is electrically connected at its other end to the battery case 6 serving as a positive electrode terminal. A resin frame member 4 is disposed on top of the electrode group 9, the frame member serving to insulate the electrode group 9 from the sealing plate 5, as well as to insulate the negative electrode lead 14 from the battery case 6. The opening of the battery case 6 is sealed with the sealing plate 5.

The present invention will be specifically described below with reference to Examples and Comparative Examples. It is to be noted, however, the present invention is not limited to the following Examples.

Example 1

Preparation of Negative Electrode Material LSX

Silicon dioxide was mixed with lithium carbonate such that the atomic ratio: Si/Li became 1.05. The mixture was fired in air at 950° C. for 10 h, to obtain a lithium silicate represented by a formula: $Li_2Si_2O_5$ (u=0.5). The obtained lithium silicate was pulverized to have an average particle diameter of 10 μm.

The lithium silicate ($Li_2Si_2O_5$) having an average particle diameter of 10 μm and a raw material silicon (3N, average particle diameter: 10 μm) were mixed at a mass ratio of 45:55. The mixture was placed in a pot (made of SUS, volume: 500 mL) of a planetary ball mill (P-5, available from Fritsch Co., Ltd.), together with 24 SUS balls (diameter: 20 mm). In the pot with the lid closed, the mixture was pulverized at 200 rpm for 50 h in an inert atmosphere.

Next, the powdered mixture was taken out from the pot in an inert atmosphere, which was then fired at 800° C. for 4 h, in an inert atmosphere, with a predetermined pressure applied by a hot press machine, to give a sintered body of the mixture (negative electrode material LSX).

Thereafter, the negative electrode material LSX were pulverized and passed through a 40-μm mesh, and then, the obtained LSX particles were mixed with a coal pitch (MCP 250, available from JFE Chemical Corporation). The mixture was fired at 800° C. in an inert atmosphere, to coat the LSX particles with an electrically conductive carbon, so that a conductive layer was formed on the particle surfaces. The amount of the conductive layer relative to the total mass of the LSX particles and the conductive layer was 5 mass %. Thereafter, a sieve was used to obtain LSX particles with the conductive layer formed thereon and having an average particle diameter of 5 μm.

The crystallite size of the silicon particles calculated by using the Scherrer formula from a diffraction peak attributed to the Si (111) plane obtained by XRD analysis of the LSX particles was 15 nm.

The composition of the lithium silicate phase was analyzed using the methods above (high-frequency induction heating furnace combustion and infrared absorption method, inert gas melting and non-dispersion type infrared absorption method, inductively coupled plasma emission spectroscopy (ICP-AES)). The result showed that the Si/Li ratio was 1.0, and the content of $Li_2Si_2O_5$ measured by Si-NMR was 45 mass % (the content of silicon particles was 55 mass %).

Production of Negative Electrode

The LSX particles with the conductive layer formed thereon were mixed with graphite, and the resultant mixture was used as a negative electrode active material. The ratio of the graphite to the total of the LSX particles with the conductive layer formed thereon and the graphite was 94 mass %. The negative electrode active material was mixed with a sodium salt of carboxymethyl cellulose (CMC-Na), polyacrylic acid (PAA), and styrene-butadiene rubber (SBR), to which water was added. The mixture was stirred in a mixer (T.K. HIVIS MIX, available from PRIMIX Corporation), to prepare a negative electrode slurry.

The CMC-Na had a degree of neutralization of 70% and a weight-average molecular weight of 250,000. The CMC-Na was added in an amount of 1 part by mass per 100 parts by mass of the negative electrode active material. The PAA was added in an amount of 1 part by mass per 100 parts by mass of the negative electrode active material. The SBR was added in an amount of 1 part by mass per 100 parts by mass of the negative electrode active material.

Next, the negative electrode slurry was applied onto copper foil, so that the mass of a negative electrode mixture per 1 m² of the copper foil was 190 g. The applied film was dried, and then rolled, to give a negative electrode with a negative electrode mixture layer having a density of 1.5 g/cm³ formed on both sides of the copper foil.

Production of Positive Electrode

A lithium-nickel composite oxide ($LiNi_{0.8}Co_{0.18}Al_{0.02}O_2$) was mixed with acetylene black and polyvinylidene fluoride in a mass ratio of 95:2.5:2.5, to which N-methyl-2-pyrrolidone (NMP) was added. The mixture was stirred in a mixer (T.K. HIVIS MIX, available from PRIMIX Corporation), to prepare a positive electrode slurry. Next, the positive electrode slurry was applied onto aluminum foil. The applied film was dried, and then rolled, to give a positive electrode with a positive electrode mixture layer having a density of 3.6 g/cm³ formed on both sides of the aluminum foil.

Preparation of Electrolyte

A lithium salt was dissolved in a non-aqueous solvent, to prepare an electrolyte. The non-aqueous solvent used here was a mixed solvent containing ethylene carbonate (EC), dimethyl carbonate (DMC), and methyl acetate (MA) in a volume ratio of 20:40:40. The concentration of LFSI in the electrolyte and the concentration of $LiPF_6$ in the electrolyte were as shown in Table 1.

Fabrication of Non-Aqueous Electrolyte Secondary Battery

The positive electrode and the negative electrode, with a tab attached to each electrode, were wound spirally with a separator interposed therebetween such that the tab was positioned at the outermost layer, thereby to form an electrode group. The electrode group was inserted into an outer case made of aluminum laminated film and dried under vacuum at 105° C. for 2 h. The non-aqueous electrolyte was injected into the case, and the opening of the outer case was sealed. A battery A1 was thus obtained.

Examples 2 to 9

In the production of a negative electrode, the ratio of the graphite to the total of the LSX particles with the conductive layer formed thereon and the graphite was as shown in Table 1, and CMC-Na was added in an amount as shown in Table 1 per 100 parts by mass of the negative electrode active material. In the preparation of an electrolyte, the concentration of LFSI in the electrolyte and the concentration of $LiPF_6$ in the electrolyte were as shown in Table 1. Batteries A2 to A9 were fabricated in the same manner as in Example 1, except the above.

Comparative Example 1

In the production of a negative electrode, the ratio of the graphite to the total of the LSX particles with the conductive layer formed thereon and the graphite was 91 mass %, and no CMC-Na was used. In the preparation of an electrolyte, $LiPF_6$ was used singly as the lithium salt, and the concentration of $LiPF_6$ in the electrolyte was 1.2 mol/L. A battery B1 was fabricated in the same manner as in Example 1, except the above.

Comparative Example 2

In the preparation of an electrolyte, $LiPF_6$ was used singly as the lithium salt, and the concentration of $LiPF_6$ in the electrolyte was 1.2 mol/L. A battery B2 was fabricated in the same manner as in Example 1, except the above.

Comparative Example 3

A battery B3 was fabricated in the same manner as in Example 1, except that in the production of a negative electrode, no CMC-Na was used.

Comparative Example 4

In the production of a negative electrode, graphite was used singly as the negative electrode active material, and CMC-Na was added in an amount of 0.5 parts by mass per 100 parts by mass of the negative electrode active material. In the preparation of an electrolyte, $LiPF_6$ was used singly as the lithium salt, and the concentration of $LiPF_6$ in the electrolyte was 1.0 mol/L. A battery B4 was fabricated in the same manner as in Example 1, except the above.

Each of the batteries fabricated above was evaluated for the following properties.

Evaluation 1: Initial Capacity

A constant-current charge was performed at a current of 0.3 It (990 mA) until the voltage reached 4.2 V, and then a constant-voltage charge was performed at a voltage of 4.2 V until the current reached 0.015 It (50 mA). This was followed by a constant-current discharge at 0.3 It (990 mA) until the voltage reached 2.75 V. The rest time between charge and discharge was 10 min. The charge and discharge were performed in a 25° C. environment. A discharge capacity D1 at this time was measured as an initial capacity.

Evaluation 2: Internal Resistance (DC-IR)

Charge and discharge were performed under the same conditions as the evaluation 1 above, and charge was further performed under the same conditions as the evaluation 1 above. After the charge was completed, the battery was left to rest for 60 min. Thereafter, a constant-current discharge was performed at 0.3 It (990 mA) for 10 s. A value obtained by dividing a difference between voltages before the start of the discharge and after 10 s from the start of the discharge by a current value 0.3 It was referred to as an initial internal resistance (DC-IR).

Evaluation 3: Cycle Capacity Retention Ratio

A constant-current charge was performed at a current of 0.3 It (990 mA) until the voltage reached 4.2 V, and then, a constant-voltage charge was performed at a voltage of 4.2 V until the current reached 0.015 It (50 mA). This was followed by a constant-current discharge at 0.3 It (990 mA) until the voltage reached 2.75 V. The rest time between charge and discharge was 10 min. The charge and discharge were performed in a 25° C. environment.

Charge and discharge was repeated under the conditions above. A ratio of a discharge capacity at the 500th cycle to a discharge capacity at the 1st cycle was calculated as a cycle capacity retention ratio.

The evaluation results are shown in Table 1. The CMC-Na amount in Table 1 is an amount (parts by mass) per 100 parts by mass of the negative electrode active material. The graphite amount is a ratio (mass %) of the graphite to the total of the LSX particles (Si-containing material) with the conductive layer formed thereon and the graphite. C1+C2 is a total concentration (mol/L) of LFSI and $LiPF_6$ in the electrolyte. C1/(C1+C2)×100 is a ratio (mol %) of LFSI to the total of LFSI and $LiPF_6$.

TABLE 1

| | Electrolyte | | | | Negative electrode | | Evaluation | | |
|---|---|---|---|---|---|---|---|---|---|
| | LFSI | $LiPF_6$ | | | | | | | Cycle |
| Battery | concentration C1 (mol/L) | concentration C2 (mol/L) | C1 + C2 (mol/L) | C1/(C1 + C2) × 100 (mol/%) | CMC-Na amount (pts · m) | Graphite amount (mass %) | Initial capacity (mAh) | Internal resistance (mΩ) | capacity retention ratio (%) |
| A1 | 0.6 | 0.6 | 1.2 | 50.0 | 1 | 94 | 3240 | 80 | 90 |
| A2 | 0.4 | 0.9 | 1.3 | 30.8 | 0.5 | 98 | 3296 | 77 | 88 |
| A3 | 0.2 | 1.1 | 1.3 | 15.4 | 0.75 | 92 | 3400 | 77 | 90 |
| A4 | 1.1 | 0.3 | 1.4 | 78.6 | 1.5 | 90 | 3344 | 82 | 91 |
| A5 | 0.1 | 1.2 | 1.3 | 7.7 | 1 | 91 | 3224 | 85 | 87 |
| A6 | 0.2 | 1.3 | 1.5 | 13.3 | 2 | 90 | 3136 | 96 | 77 |
| A7 | 0.1 | 1.8 | 1.9 | 5.3 | 1 | 94 | 3096 | 94 | 80 |
| A8 | 0.5 | 0.4 | 0.9 | 55.6 | 0.5 | 98 | 3056 | 98 | 81 |
| A9 | 0.4 | 1.7 | 2.1 | 19.0 | 1 | 95 | 3062 | 97 | 80 |
| B1 | 0 | 1.2 | — | — | 0 | 91 | 2720 | 108 | 62 |
| B2 | 0 | 1.2 | — | — | 1 | 94 | 2869 | 122 | 69 |
| B3 | 0.6 | 0.6 | 1.2 | 50.0 | 0 | 94 | 2780 | 118 | 70 |
| B4 | 0 | 1.0 | — | — | 0.5 | 100 | 3040 | 113 | 76 |

The batteries A1 to A9 of Examples 1 to 9 exhibited a high initial capacity, a low internal resistance, and a high cycle capacity retention ratio.

In particular, in the batteries A1 to A5 of Examples 1 to 5, a higher initial capacity, a smaller internal resistance, and a higher cycle capacity retention ratio were obtained. In Examples 1 to 5, the graphite amount was 98 mass % or less, and the CMC-Na amount was 1.5 parts by mass or less. The total concentration of LFSI and $LiPF_6$ in the electrolyte was 1 mol/L or more and 2 mol/L or less; and the ratio of LFSI to the total of LFSI and $LiPF_6$ was 7 mol % or more and 79 mol % or less. The concentration of LFSI in the electrolyte was 0.1 mol/L or more and 1.1 mol/L or less, and the concentration of $LiPF_6$ in the electrolyte was 0.3 mol/L to 1.3 mol/L or less.

In the battery B1 of Comparative Example 1, using none of CMC-Na and LFSI resulted in an increase in the internal resistance, a decrease in the initial capacity, and a reduction in the cycle capacity retention ratio. In the battery B2 of Comparative Example 2, using no LFSI resulted in an increase in the internal resistance, a decrease in the initial capacity, and a reduction in the cycle capacity retention ratio. In the battery B3 of Comparative Example 3, using no CMC-Na resulted in an increase in the internal resistance, a decrease in the initial capacity, and a reduction in the cycle capacity retention ratio. In the battery B4 of Comparative Example 4, using no LFSI resulted in an increase in the internal resistance and a reduction in the cycle capacity retention ratio, and using none of FSI and Si-containing material resulted in a decrease in the initial capacity.

INDUSTRIAL APPLICABILITY

The non-aqueous electrolyte secondary battery according to the present invention is useful as a main power supply for mobile communication equipment, portable electronic equipment, and other devices.

REFERENCE SIGNS LIST 4 frame member
5 sealing plate
6 battery case
9 electrode group
11 positive electrode lead
13 negative electrode terminal
14 negative electrode lead

The invention claimed is:

1. A non-aqueous electrolyte secondary battery comprising a positive electrode, a negative electrode, and an electrolyte,
the negative electrode including a negative electrode active material capable of electrochemically absorbing and releasing lithium, and a binder;
the negative electrode active material including a Si-containing material and a carbon material;
the Si-containing material includes a composite material including a lithium silicate phase and silicon particles dispersed in the lithium silicate phase;
a ratio of the carbon material to a total of the Si-containing material and the carbon material is 70 mass % or more and 98 mass % or less;
the silicon particles dispersed in the lithium silicate phase have a crystallite size of 10 nm or more;
the binder including at least one cellulose compound selected from the group consisting of a carboxyalkyl cellulose and a salt thereof;
the electrolyte including a non-aqueous solvent, and a lithium salt dissolved in the non-aqueous solvent;
the lithium salt including lithium bis(fluorosulfonyl)imide: LFSI.

2. The non-aqueous electrolyte secondary battery of claim 1, wherein the carboxyalkyl cellulose is carboxymethyl cellulose.

3. The non-aqueous electrolyte secondary battery of claim 1, wherein the salt of the carboxyalkyl cellulose is a sodium salt of the carboxyalkyl cellulose.

4. The non-aqueous electrolyte secondary battery of claim 1, wherein the cellulose compound is contained in the negative electrode in an amount of 0.4 parts by mass or more and 1.5 parts by mass or less per 100 parts by mass of the negative electrode active material.

5. The non-aqueous electrolyte secondary battery of claim 1, wherein the lithium salt dissolved in the non-aqueous solvent further includes $LiPF_6$.

6. The non-aqueous electrolyte secondary battery of claim 5, wherein a total concentration of the LFSI and the $LiPF_6$ in the electrolyte is 1 mol/L or more and 2 mol/L or less.

7. The non-aqueous electrolyte secondary battery of claim 5, wherein a ratio of the LFSI to a total of the LFSI and the $LiPF_6$ is 7 mol % or more and 79 mol % or less.

8. The non-aqueous electrolyte secondary battery of claim 5, wherein a ratio of the LFSI to a total of the LFSI and the $LiPF_6$ is 15 mol % or more and 50 mol % or less.

9. The non-aqueous electrolyte secondary battery of claim 5, wherein
the LFSI is contained at a concentration of 0.1 mol/L or more and 1.1 mol/L or less in the electrolyte, and
the $LiPF_6$ is contained at a concentration of 0.3 mol/L or more and 1.3 mol/L or less in the electrolyte.

10. The non-aqueous electrolyte secondary battery of claim 1, wherein the non-aqueous solvent includes a chain carboxylic acid ester.

11. The non-aqueous electrolyte secondary battery of claim 1, wherein the ratio of the carbon material to a total of the Si-containing material and the carbon material is 75 mass % or more and 95 mass % or less.

12. The non-aqueous electrolyte secondary battery of claim 1, wherein the lithium silicate phase has a composition represented by $Li_{2u}SiO_{2+u}$ ($0<u\leq2$).

13. The non-aqueous electrolyte secondary battery of claim 1, wherein the Si-containing material consists of a composite material including a lithium silicate phase and silicon particles dispersed in the lithium silicate phase, and an electrically conductive material covering at least a part of a surface of the composite material.

* * * * *